United States Patent Office 2,967,392
Patented Jan. 10, 1961

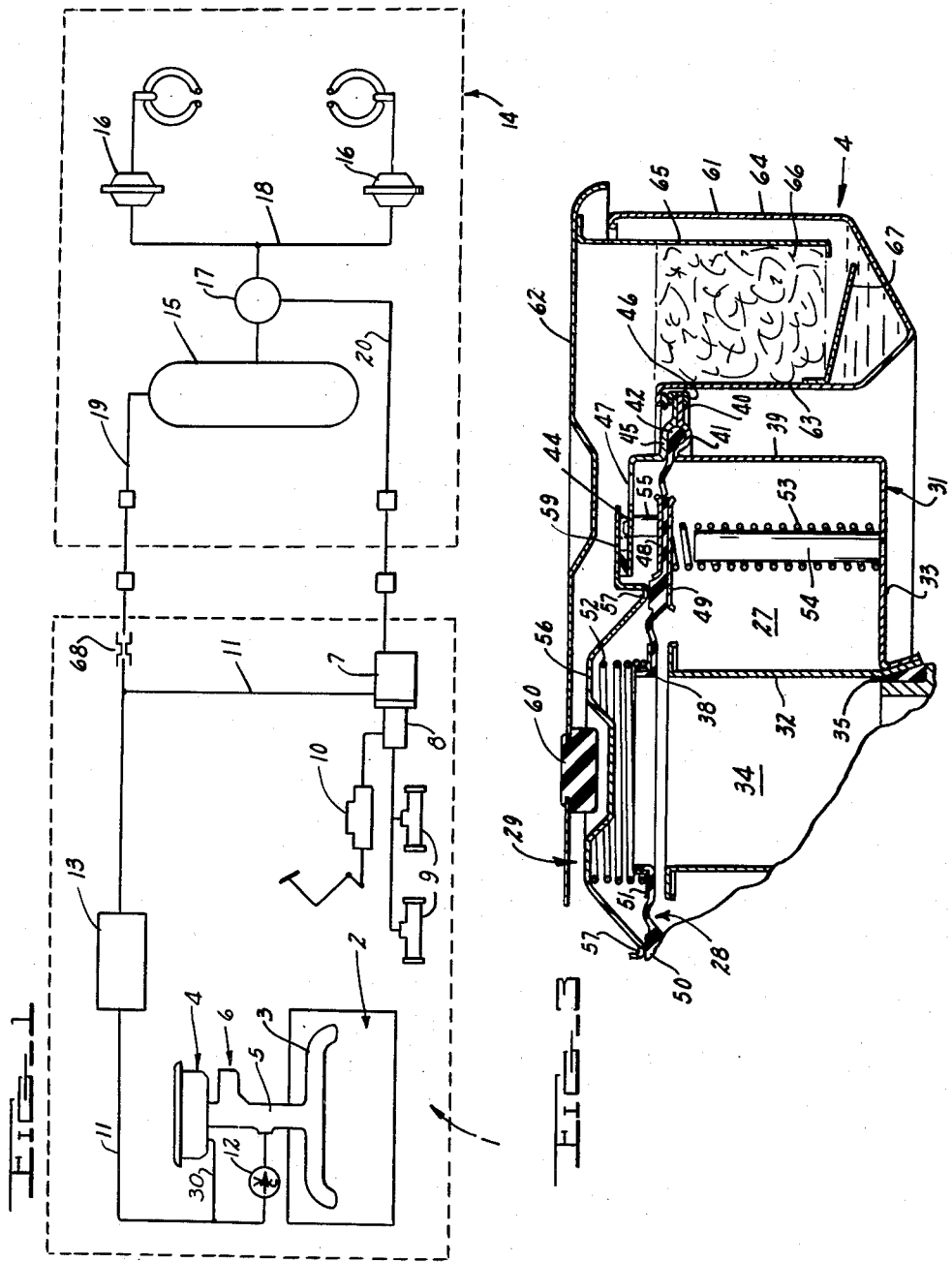

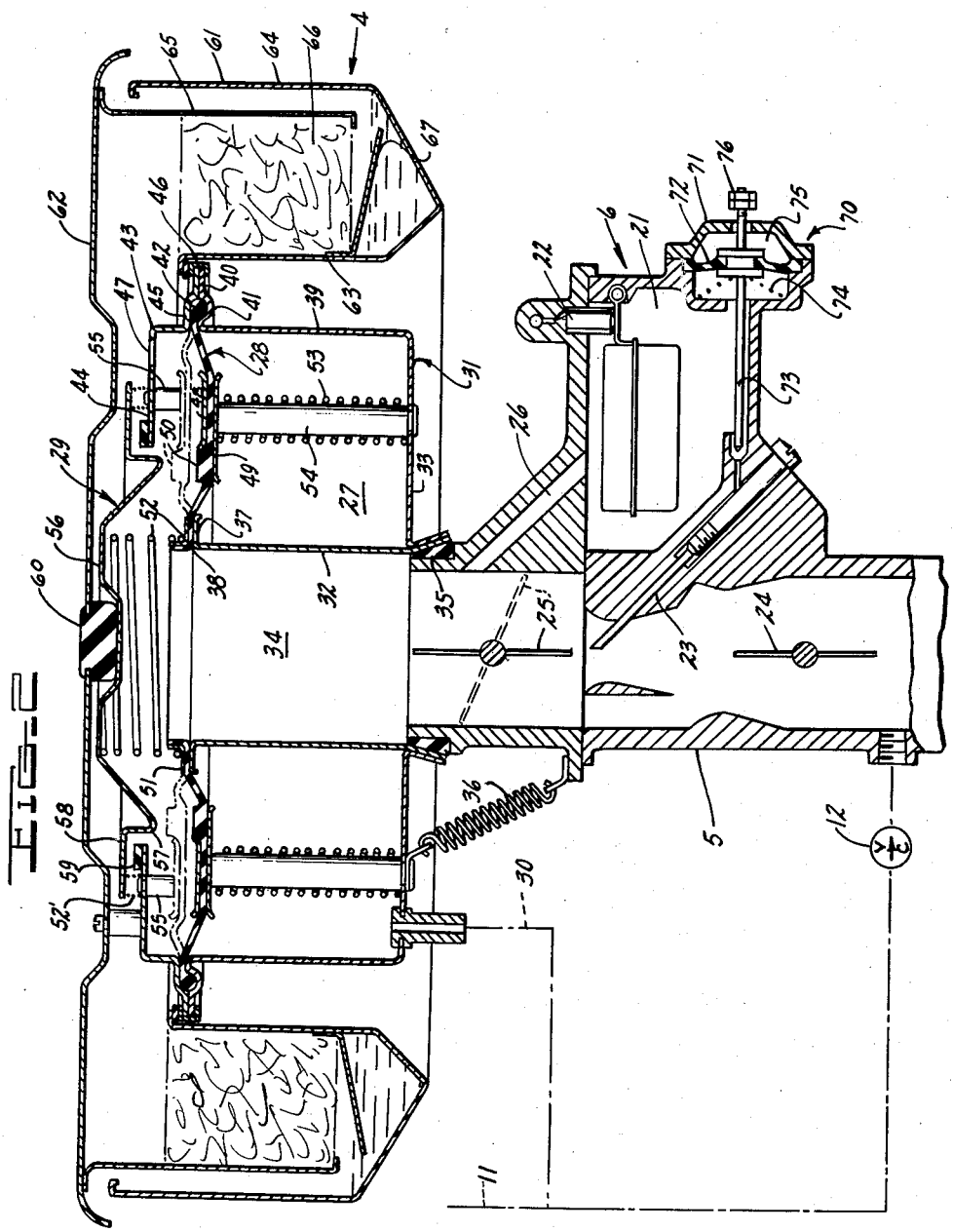

2,967,392

CONTROL DEVICE FOR UTILIZING AN INTERNAL COMBUSTION ENGINE TO CREATE SUBATMOSPHERIC PRESSURE

William Stelzer, Summit, N.J., assignor to Kelsey-Hayes Company, a corporation of Delaware Filed Apr. 30, 1956, Ser. No. 581,671

4 Claims. (Cl. 60—14)

The invention relates to the utilization of an internal combustion engine, serving as a prime mover for a motor vehicle, to create sub-atmospheric pressure in a power braking system associated with the motor vehicle.

The invention has for other objects to provide an improved control device which is automatic in operation and controls the operation of the engine to function as a prime mover or as a vacuum pump; to provide a control device which is operable to close off the regular air to the engine for an instant or brief interval and during this instant to connect the engine to a vacuum chamber of the control device which chamber in turn is connected to the braking system, so that the engine draws air from the vacuum chamber and braking system; and to so construct and proportion the control device and the braking system with respect to the engine that the volume of air withdrawn by the engine is small relative to the available or usable pumping capacity of the engine so that the engine operates as a vacuum pump to withdraw air for only a relatively short time, which may be a fraction of a second, with the result that the operation of the engine is practically undisturbed.

The invention has for a further object to provide an improved control device which may be incorporated in different locations or in different units associated with the intake of the engine, as for example, in an air cleaner.

These and other objects will become apparent from the following description and the accompanying drawings, in which:

Figure 1 is a schematic view of a tractor trailer braking system and a control device embodying the invention for utilizing the tractor engine to create subatmospheric pressure in the braking system;

Figure 2 is a vertical section through the control device and associated parts;

Figure 3 is a similar view of a portion of Figure 2 showing the movable parts in different positions.

As illustrated schematically in Figure 1, the motor vehicle 1 is equipped with the internal combustion engine 2 which serves as a prime mover for the motor vehicle. The motor vehicle also has associated with it a power braking system which employs sub-atmospheric pressure in securing differential pressure to apply the brake means. The internal combustion engine 2 is conventional and equipped with air intake means which comprises the intake manifold 3, the air cleaner 4 and the intermediate air intake line 5 with which latter the carburetor 6 is associated.

The invention is applicable to a power braking system of a motor vehicle and a power braking system of a trailer connected to the motor vehicle when being used as a tow vehicle or tractor.

The power braking system of the motor vehicle is conventional and has the booster 7 provided with the hydraulic cylinder 8, the wheel cylinders 9 for applying the brakes and the manually operable master cylinder 10. The wheel cylinders are hydraulically connected to the hydraulic cylinder and the master cylinder is hydraulically connected to the booster and controls its operation. The booster is of the vacuum suspended type and is connected by the vacuum line 11 to the air intake means of the engine below the carburetor, the check valve 12 being located in the vacuum line. Also the auxiliary vacuum tank 13 is located in the vacuum line at the side of the check valve opposite the air intake means.

The power braking system of the trailer 14 is of conventional construction and has the vacuum tank 15, the air suspended type actuators 16 for the trailer brakes and the relay or conversion valve 17 for connecting the actuators 16 to the vacuum tank 15 through the lines 18. The vacuum tank 15 is connected by the line 19 to the vacuum line 11 and the valve 17 is connected by the control line 20 to the variable pressure side of the power piston of the booster 7.

Referring more particularly to Figure 2, the carburetor 6 is conventional and has the bowl 21, the float operated valve 22 controlling entrance of liquid fuel to the bowl, the main jet 23 for conducting liquid fuel from the bowl to the air intake line 5 between the throttle and choke valves 24 and 25, respectively, and the bowl vent 26 leading from the bowl to the air intake line above the choke valve.

The control device in the present instance is incorporated in the air cleaner 4 and forms a unitary structure therewith. The control device has the central annular vacuum chamber 27, the flexible diaphragm 28 for closing the upper end of the chamber and the poppet valve 29 forming with the diaphragm a passage for the regular air for the engine. Both the diaphragm and the poppet valve also constitute valve members controlling the flow of the regular air through the passage. The vacuum chamber communicates with the auxiliary vacuum tank 13 through the vacuum line 30 which extends from the lower portion of the vacuum chamber to the vacuum line 11 in which the tank 13 is located. The vacuum chamber is formed by the cup-shaped member 31 and the concentric central tube 32 which extends air-tight through the bottom wall 33 of the cup-shaped member. The central tube forms a vertical air passage 34 and has a downwardly flared lower end telescoped over the air intake line 5 and held firmly against the air seal 35 by the coil springs 36 between the air intake line 5 and the bottom wall 33. The central tube also has at its upper end the radially outwardly extending annular flange 37 which serves as a seat for the lower side of the radially inner edge portion 38 of the diaphragm 28, this edge portion constituting a check valve providing for the withdrawal of air from the vacuum chamber 27. The outer wall 39 of the cup-shaped member 31 has at its upper edge the radially outwardly extending annular flange 40 which is formed with the annular groove 41 receiving the bead 42 at the radially outer edge of the diaphragm 28. The bead is clamped in the groove by the plate 43 having the annular flat spring portion 44 spaced upwardly above the diaphragm 28 and the downwardly offset annular flange 45 extending radially outwardly over the bead 42 and suitably secured to the flange 40 as by means of the annular channel clip 46. The flat portion 44 is formed with the air holes 47.

The diaphragm 28 is stiffened between its edges by the upper and lower plates 48 and 49, respectively, and is formed at the radially inner edge of the upper plate and above the lower plate with the upwardly extending annular ridge 50 which forms a seat for engagement by the poppet valve 29. Also, the diaphragm has bonded to the upper side of its radially inner edge portion the annular L-shaped reinforcement 51 upon which the coil spring 52 rests. The intermediate portion of the diaphragm, which is located between its edges, is resiliently urged upwardly by the annular series of coil springs 53 which are located in the vacuum chamber 27 between the bottom wall 33 and the lower plate 49 and are guided by the studs 54 secured at the bottom wall. The studs also serve as stops engageable with the lower plate to limit downward movement of the intermediate portion of the diaphragm. Upward movement of the intermediate portion is limited by the stops 55 in the nature of studs depending from the flat portion 44 of the plate 43 and engageable with the upper plate 48.

The poppet valve 29 has the central top portion 56, the downwardly extending annular V-shaped ridge 57 and the radially outer annular edge portion 58. The poppet valve is resiliently urged upwardly by the coil spring 52 and a plurality of smaller springs 52' seated on plate 44 around the stems of stops 55 where they are riveted to plate 44, the springs 52' having a fairly high rate of force as they are compressed to assure proper operation of the poppet valve. The poppet valve ridge 57 is in axial alignment with and directly above the diaphragm ridge 50 and the radially outer edge portion 58 of the poppet valve is directly above and engageable with the annular series of bumpers 59 which are mounted on the radially inner edge part of the flat portion 44 of the plate 43. Upward movement of the poppet valve is limited by the central stop 60.

The air cleaner 4 has the upwardly opening channel shaped casing 61 and the cover 62. The casing has its inner side wall 63 mounted at its upper end on the clip 46 and has its outer side wall 64 terminating below the cover. The cover 62 is mounted on and spaced above the flat portion 44 of the plate 43 and carries the stop 60. The cover has the annular wall 65 depending therefrom and between the inner and outer side walls 63 and 64, respectively, and cooperating therewith to form an inner annular space for receiving the air filter 66 and an outer annular space for entrance of air to the lower end of the filter. The lower portion of the casing forms a container for oil and is provided with the baffle 67 extending below the filter.

The diaphragm 28 and the poppet valve 29 normally cooperate to form a passage for the air between the filter 66 and the air intake means of the engine. Moreover, the diaphragm and the poppet valve constitute valve members which are relatively movable toward and away from each other and have the valve forming ridges 50 and 57, respectively, normally cooperating to form an annular gap in the last said passage. Furthermore, the diaphragm has its radially inner edge portion 38 forming a check valve providing for the withdrawal only of air from the vacuum chamber 27. When the diaphragm and the poppet valve are in the full line positions shown in Figure 2, the sub-atmospheric pressure in the vacuum chamber and the atmospheric pressure above exerting downward pressure on the diaphragm create a differential pressure overcoming the coil springs 53. Also, the gap between the diaphragm and poppet valve ridges is fully open and allows free flow of air to the engine air intake means at all speeds of the engine as long as the sub-atmospheric pressure in the vacuum chamber remains below a predetermined desirable limit for the safe operation of the power braking system.

In operation and assuming the diaphragm and the poppet valve to be in the full line positions of Figure 2, if the sub-atmospheric pressure in the vacuum chamber 27 is increased to a predetermined upper level or limit so that any further increase in pressure would be undesirable, the intermediate portion of the diaphragm is raised by the coil springs 53 to the dotted line position shown in Figure 2, this position being controlled by contact of the upper plate 48 with the stops 55. At this time, the gap is more narrow or restricted but permits sufficient flow of air to the engine when the latter is idling or running at low speed. However, if the engine is running above a predetermined speed, and more particularly at a relatively high speed, the gap imposes a resistance to the flow of air and causes or induces a drop in pressure radially inwardly of the gap and the resulting differential pressure acting above and below the poppet valve 29 forces the poppet valve downwardly against the effort exerted by the coil spring 52. During the downward movement, the gap becomes more restricted and is finally completely closed by the poppet valve ridge 57 engaging the diaphragm ridge 50 after which the edge portion 58 of the poppet valve engages the bumpers 59. As soon as the gap is closed, the regular air supply to the engine is cut off and the engine becomes a vacuum pump and decreases the sub-atmospheric pressure above the check valve 38 so that it is raised from its seat 37 by the higher sub-atmospheric pressure below it and air is withdrawn from the vacuum chamber 27 and through the engine air intake means and will be used in the fuel mixture. The poppet valve and diaphragm at this time are in the full line positions shown in Figure 3, and it will be noted that the force exerted by the air at atmospheric pressure on the diaphragm and opposing the springs 53 is reduced inasmuch as the air through 47 acts on a part only of the diaphragm area which extends radially outwardly from the ridge 50. As a result, the central portion of the diaphragm cannot be moved downwardly before a good vacuum is produced in the vacuum chamber. When the central portion of the diaphragm 28 is moved downwardly, the gap is opened to increase the pressure radially inwardly of the gap, thereby to close the check valve 38 and return the poppet valve to its upper position by the coil springs 52'. The pumping capacity of the engine which is available or usable while the engine is functioning as a vacuum pump is large relative to the volume of air to be withdrawn from the vacuum chamber so that practically undisturbed operation of the engine, while functioning as a vacuum pump, is obtained where the engine speed remains substantially constant or may be reduced only to a small extent so as not to be objectionable. As a result, the desired sub-atmospheric pressure in the vacuum chamber can be secured in an instant or brief interval, which may be a fraction of a second, but in any event, is such a short time that the engine operation is practically undisturbed. In this connection, restrictions in the lines can be provided to reduce the interval of time during which the regular air supply to the engine is shut off. Thus, restriction 68 in line 19 retards the communication of the vacuum pressure in chamber 27 and tank 13 to the main tank 15, so that a full vacuum in chamber 27 and tank 13 is more quickly attained to thereby unseat poppet valve 29 from ridge 50 and re-establish the normal flow of air to the engine, though only for a short time, since after an equalization of pressures between chamber 27 and tank 15, the pressure in chamber 27 may have become sufficiently increased again to cause the start of another operating cycle. Thus, a plurality of such intermittent operating cycles may take place. The construction provided is intended to prevent an operating condition where poppet valve 29 is not permitted to quickly return to its upper position after ridge 50 of diaphragm 28 breaks away from ridge 57. This is effected by the rate of springs 52' the force of each when compressed being substantially greater than when released in order to oppose the greater differential pressure on poppet valve 29 when the gap between ridge 50 and ridge 57 is still small. Another factor in releasing poppet valve 29 is the resiliency of plate 44 and the fact that as soon as a small gap is produced, the atmospheric pressure becomes effective on a larger area of diaphragm 28 by including the area between ridge 50 and check valve 38. If the duration of the operating cycle, or the time during which the engine acts exclusively as a vacuum pump, is too short, it may be increased by tank 13, where the capacity of the latter is added to that of chamber 27. In this case, it is desirable to use a line 30 or its connection to chamber 27 offering the minimum resistance to the flow of air. The restriction 68 is indicated diagrammatically as it may represent the restriction of the entire line 19 when smaller conduits are used.

While most carburetors of modern design are of the venturi type and, have the equivalent of a bowl vent 26 to prevent flooding due to a sub-atmospheric pressure in the air intake passage resulting from the resistance offered by the air cleaner, there are, nevertheless, certain carburetor systems where the fuel admixed to the air is governed by other means than the suction of the venturi alone. If the fuel mixture depends merely on the speed of the engine, then it would be too rich while the carburetor receives air only from chamber 27. To prevent such an over-rich mixture, I provide a control device indicated in general by numeral 70 and comprising a cap 71 secured to the carburetor bowl 21 with a diaphragm 72 interposed carrying a needle valve 73 to shut off the supply of fuel to the main jet 23. A spring 74 biases the needle valve into an open position. The chamber 75 between the cap and diaphragm 72 is open to the atmosphere, while the opposite side of the diaphragm is subject to the pressure existing in the carburetor bowl 21 and passage 34. Adjusting nuts 76 on the stem of the needle valve are provided so that the needle valve can be adjusted to effect a predetermined leakage in the closed position. In operation, when a vacuum is created in passage 34 upon closure of poppet valve 29, the suction is communicated through the bowl vent and bowl 21 to the left side of diaphragm 72 so that the atmospheric pressure in chamber 75 pushes the needle valve to the left until nuts 76 abut against cap 71, thereby causing a restriction in the flow through main jet 23, or closing off the supply of fuel altogether, depending on the adjustment of nuts 76, as long as a suction exists in passage 34.

What I claim as my invention is:

1. A control device for utilizing an internal combustion engine serving as a prime mover for a motor vehicle to create subatmospheric pressure in a braking system associated with the vehicle comprising means providing a passage for regular air used in the fuel mixture for the engine, means providing a chamber in communication with the braking system, valve means responsive to an increase in the pressure in said chamber to a predetermined upper level for momentarily closing said passage, and check valve means connected between said chamber and the downstream side of the said first valve means for placing said chamber in communication with the engine to facilitate withdrawal of air from said chamber by the engine while said passage is momentarily closed and thereby reduce the pressure in the braking system.

2. A control device for utilizing an internal combustion engine, equipped with a throttle controlled intake for regular air used in the engine fuel mixture, and serving as a prime mover for a motor vehicle to create subatmospheric pressure in a braking system associated with the motor vehicle comprising means providing a passage for regular air leading to the air intake, means providing a chamber in communication with the braking system, valve means responsive to an increase in the pressure in said chamber to a predetermined upper level for momentarily closing said passage, and check valve means connected between said chamber and the downstream side of the said first valve means upstream of the throttle responsive to the closing of said passage for placing said chamber in communication with the engine to facilitate withdrawal of air from said chamber by the engine and thereby reduce the pressure in the braking system.

3. A control device for utilizing an internal combustion engine, equipped with a throttle controlled intake for regular air used in the engine fuel mixture, and serving as a prime mover for a motor vehicle to create subatmospheric pressure in a braking system associated with the motor vehicle comprising means providing a passage for regular air leading to the air intake, means providing a chamber in communication with the braking system, means responsive to an increase in the pressure in said chamber to a predetermined upper level for restricting said passage, valve means responsive to a reduced pressure in said passage produced by said restriction to close said passage, and check valve means connected between said chamber and the downstream side of the said first valve means responsive to the closing of said passage for placing the braking system in communication with the engine to facilitate withdrawal of air from said chamber by the engine and thereby reduce the pressure in the braking system.

4. A control device for utilizing an internal combustion engine, equipped with a throttle controlled intake for regular air used in the engine fuel mixture, and serving as a prime mover for a motor vehicle to create subatmospheric pressure in a braking system associated with the vehicle comprising means providing a passage for regular air leading to the air intake, means providing a chamber in communication with the braking system, said chamber being small relative to the available pumping capacity of the engine, valve means responsive to an increase in the pressure in said chamber to a predetermined upper level for closing said passage, and check valve means connected between said chamber and the downstream side of the said first valve means responsive to the closing of said passage for placing said chamber in communication with the engine to facilitate withdrawal of air from said chamber by the engine and thereby reduce the pressure in the braking system, said first-mentioned valve means being responsive to a decrease in the pressure in said chamber to a predetermined lower level for reopening said passage, and said check valve means being responsive to reopening of said passage for closing communication between said chamber and the engine.

References Cited in the file of this patent

UNITED STATES PATENTS

| | | |
|---|---|---|
| 1,541,266 | Kennington | June 9, 1925 |
| 1,665,306 | Kennington | Apr. 10, 1928 |
| 1,741,817 | Bragg et al. | Dec. 31, 1929 |
| 2,061,488 | Shelor | Nov. 17, 1936 |
| 2,204,706 | Searle | June 18, 1940 |
| 2,725,717 | Ericson | Dec. 6, 1955 |